United States Patent
Walz et al.

(10) Patent No.: US 9,421,616 B2
(45) Date of Patent: Aug. 23, 2016

(54) MACHINE TOOL

(75) Inventors: Jürgen Walz, Frickenhausen (DE); Franco Rigolone, Ponteranica (IT); Gottfried Deuringer, Geretsried (DE); Renato Rota, Carvico (IT); Manuel Gerst, Bielefeld (DE)

(73) Assignee: GILDEMEISTER ITALIANA S.P.A., Brembate di Sopra (IT)

( * ) Notice: Subject to any disclaimer, the term of this patent is extended or adjusted under 35 U.S.C. 154(b) by 188 days.

(21) Appl. No.: 14/122,969

(22) PCT Filed: May 18, 2012

(86) PCT No.: PCT/EP2012/059284
§ 371 (c)(1),
(2), (4) Date: May 23, 2014

(87) PCT Pub. No.: WO2012/163698
PCT Pub. Date: Dec. 6, 2012

(65) Prior Publication Data
US 2014/0245870 A1    Sep. 4, 2014

(30) Foreign Application Priority Data
May 31, 2011 (DE) .......... 10 2011 076 834

(51) Int. Cl.
*B23Q 39/00* (2006.01)
*B23B 3/16* (2006.01)
(Continued)

(52) U.S. Cl.
CPC .............. *B23B 29/242* (2013.01); *B23B 3/168* (2013.01); *B23B 3/30* (2013.01); *B23Q 39/02* (2013.01);
(Continued)

(58) Field of Classification Search
CPC .......... B23B 3/168; B23B 3/167; B23B 3/30; B23Q 39/026
See application file for complete search history.

(56) References Cited

U.S. PATENT DOCUMENTS 5,127,140 A * 7/1992 Oiwa ................. B23B 3/167
29/27 C
6,626,075 B2 * 9/2003 Hirose ................ B23B 3/168
82/118

(Continued)

FOREIGN PATENT DOCUMENTS

DE     279 429 A1   6/1990
DE   195 28 404 A1   2/1997
(Continued)

OTHER PUBLICATIONS

DE 10 2011 076 837.8—German Examination Report with English translation, dated Jun. 12, 2012, 13 pages.
(Continued)

*Primary Examiner* — Will Fridie, Jr.
(74) *Attorney, Agent, or Firm* — Blakely Sokoloff Taylor & Zafman LLP

(57) ABSTRACT

The present invention relates to a machine tool, in particular a lathe, having a machine frame 1, a first work spindle 21, arranged on a face of a first carrier portion 1a of the machine frame 1, for receiving a first workpiece W1, a second work spindle 22, facing the first work spindle 21 and arranged on a face of second carrier portion 1b of the machine frame 1, for receiving a second work piece W2, the spindle axis of the second work spindle 22 being aligned parallel to, in particular coaxial with, the spindle axis of the first work spindle 21, and two displaceable tool carrier slides 51 and 52 on each of which a tool-carrying tool carrier 61 or 62 is arranged. According to the invention, a third tool carrier 63 is provided which is displaceable between the work spindles 21 and 22 transverse to the spindle axes and which is arranged on a tool carrier face WTS3 of a central carrier portion 1c positioned between the first and the second carrier portion 1a, 1b.

14 Claims, 14 Drawing Sheets

(51) Int. Cl.
*B23B 29/24* (2006.01)
*B23B 3/30* (2006.01)
*B23Q 39/02* (2006.01)

(52) U.S. Cl.
CPC ......... *B23Q 39/026* (2013.01); *B23B 2270/14* (2013.01); *B23Q 2039/002* (2013.01); *B23Q 2039/004* (2013.01); *B23Q 2039/008* (2013.01); *Y10T 82/2508* (2015.01); *Y10T 82/2524* (2015.01)

(56) References Cited

U.S. PATENT DOCUMENTS

| | | | | |
|---|---|---|---|---|
| 6,758,117 | B2* | 7/2004 | Baumann | B23Q 39/026 29/36 |
| 6,948,411 | B2* | 9/2005 | Grossmann | B23Q 39/048 82/117 |
| 7,987,567 | B2* | 8/2011 | Yasuda | B23B 3/065 29/27 C |
| 8,224,477 | B2* | 7/2012 | Matsumoto | B23Q 39/04 29/27 C |
| 8,297,158 | B2* | 10/2012 | Watanabe | B23B 3/165 29/27 R |
| 9,126,266 | B2* | 9/2015 | Walz | B23B 3/168 |

FOREIGN PATENT DOCUMENTS

| | | |
|---|---|---|
| DE | 19 959 961 A1 | 6/2001 |
| DE | 10 116 994 A1 | 10/2002 |
| DE | 10 2006 015 078 A1 | 11/2006 |
| DE | 10 2006 013 783 A1 | 12/2006 |
| DE | 10 2006 026 184 A1 | 12/2007 |
| DE | 10 2011 076 834 | 12/2012 |
| EP | 0 999 002 A1 | 5/2000 |
| EP | 1 160 052 A1 | 12/2001 |
| EP | 1 897 640 A1 | 3/2008 |

OTHER PUBLICATIONS

PCT/EP2012/059287; International Search Report and English translation of Written Opinion, mail date Aug. 10, 2012, 19 pages.
PCT/EP2012/059287; English translation of International Preliminary Report on Patentability, issued Dec. 2, 2013, 12 pages.
DE 10 2011 076 835.1—German Office Action with English translation, issued Jun. 12, 2012, 11 pages.
DE 10 2011 076 834.3—German Office Action with English translation, issued Jun. 14, 2012, 11 pages.
DE 10 2011 077 571.4—German Examination Report with English translation, dated Jun. 15, 2012, 8 pages.
PCT/EP2012/059282; English translation of International Preliminary Report on Patentability, issued Dec. 2, 2013, 6 pages.
PCT/EP2012/059284; English translation of International Preliminary Report on Patentability, issued Dec. 2, 2013, 9 pages.
PCT/EP2012/059292; English translation of International Preliminary Report on Patentability, issued Dec. 2, 2013, 11 pages.

\* cited by examiner

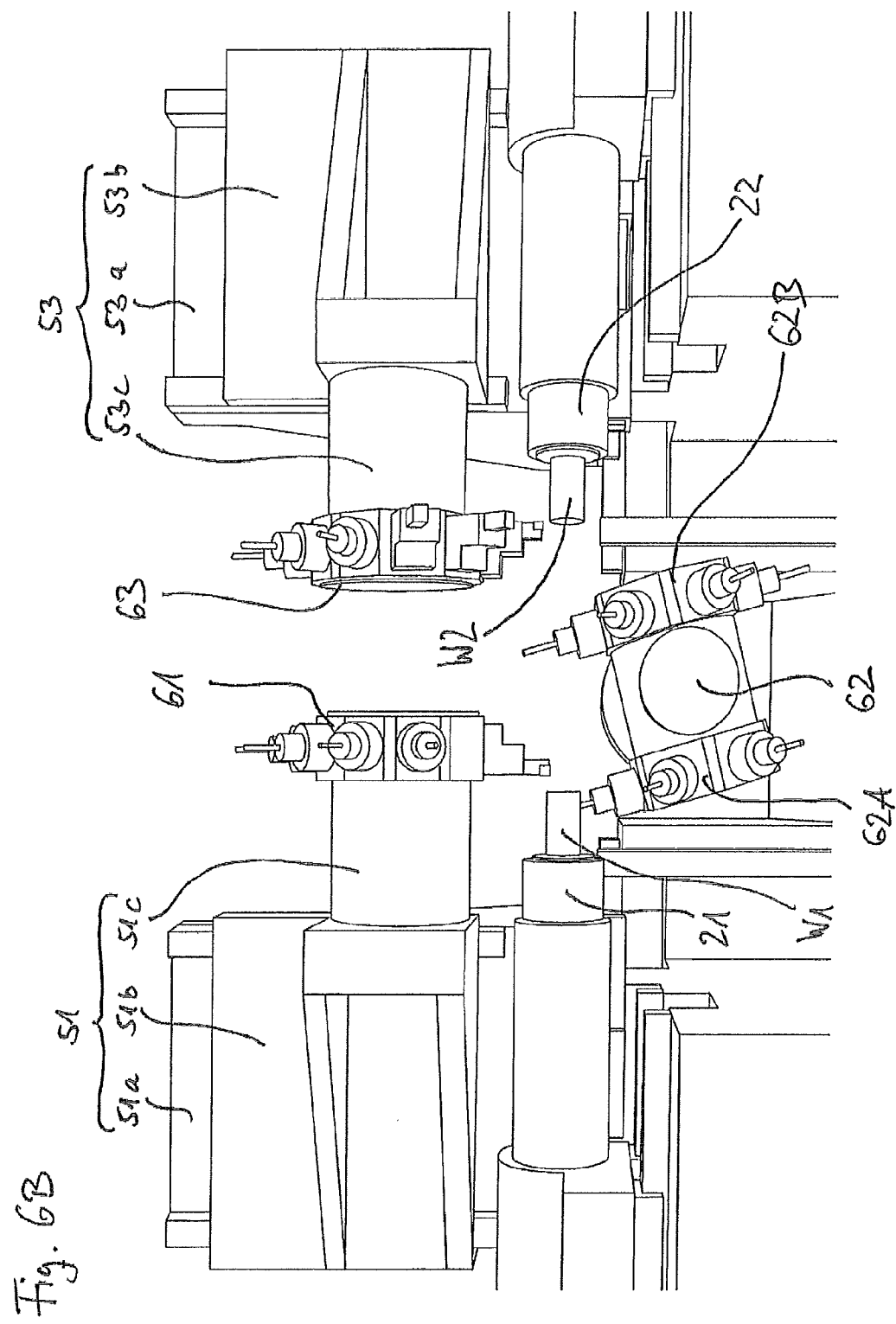

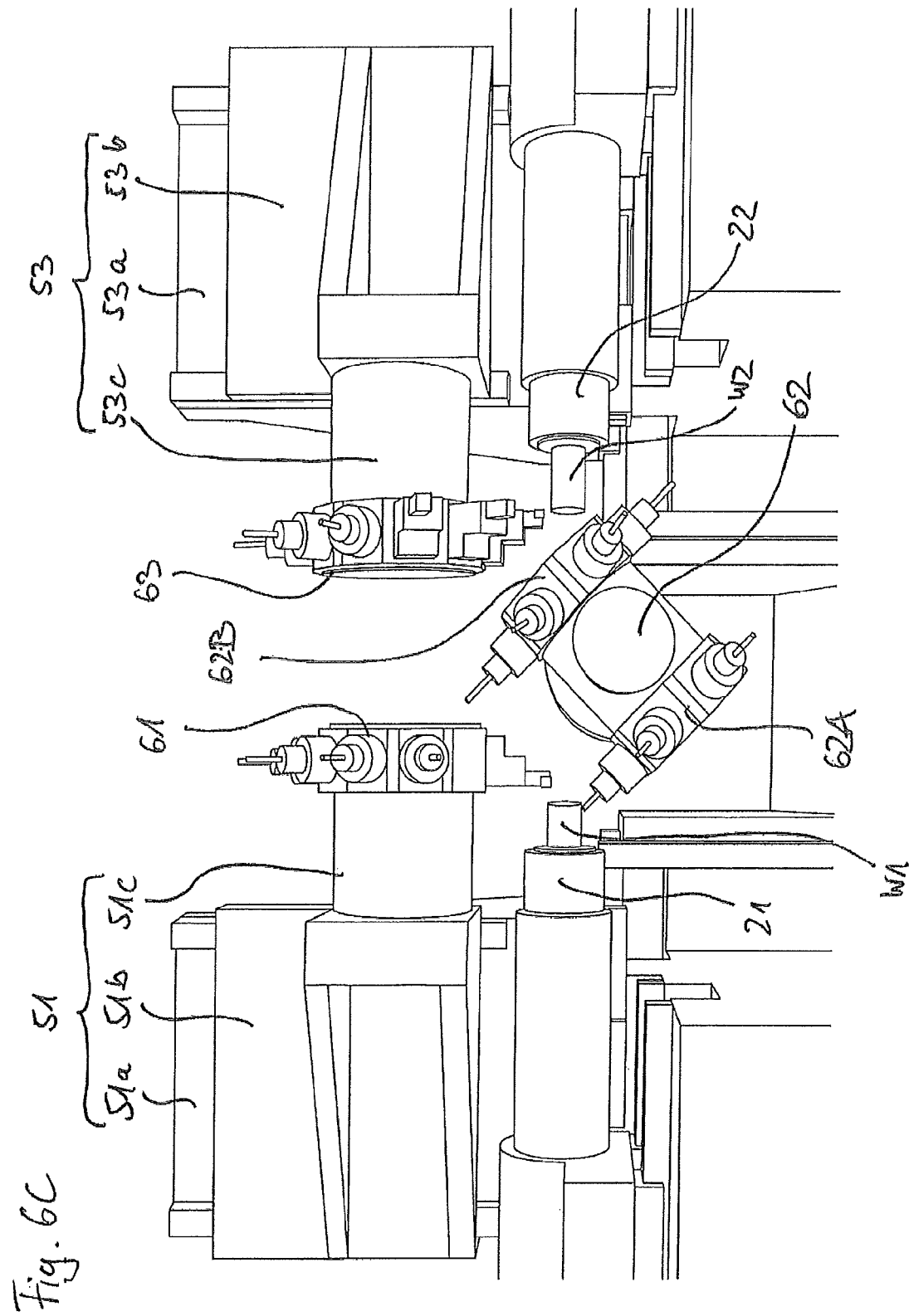

MACHINE TOOL

CROSS-REFERENCE TO RELATED APPLICATIONS

This application is the U.S. National Stage entry under 35 U.S.C. §371 of international application PCT/EP2012/059284, filed 18 May 2012, which in turn claims priority to German patent application DE 10 2011 076 834.3, filed 31 May 2011.

The present invention relates to a machine tool, in particular a lathe, having a machine frame, a first work spindle, arranged on a first carrier portion of the machine frame, for receiving a first workpiece, a second work spindle, facing the first work spindle and arranged on a second carrier portion of the machine frame, for receiving a second workpiece, the spindle axis of the second work spindle being aligned parallel to, in particular coaxial with, the spindle axis of the first work spindle, and at least two displaceable tool carrier slides on each of which a tool-carrying tool carrier is arranged.

BACKGROUND OF THE INVENTION

Generic machine tools comprise a machine frame on which at least two mutually facing rotatably mounted work spindles having parallel or coaxial spindle axes are provided, it being possible to receive workpieces, to be machined on the machine tool, on each of the work spindles. To prepare the tools for machining, at least two tool carriers are usually supplied, said tool carriers being provided on tool slides, in particular compound slides, arranged on the machine frame and which can be displaced relative to the work spindles by means of one or more linear shafts (for example being displaceable in the X, Y or Z direction). Generic machine tools of this type are known for example from DD 279 429 A1 and EP 0 999 002 A1.

In general, in generic machine tools of this type, there is a requirement to provide the machine tool in such a way that it is possible to machine the workpieces efficiently with as many tools as possible, which have the maximum capacity for simultaneous use, with the maximum possible flexibility in the control of the relative movements between the tools and the tools received in the work spindles, together with a compact and cost-effective construction of the machine tool and a machining space which the machinist or operator of the machine tool can see into as easily as possible.

The object of the invention is thus to improve a machine tool of the generic type in such a way that it is possible to machine the workpieces efficiently with as many tools as possible, which have the maximum capacity for simultaneous use, with the maximum possible flexibility in the control of the relative movements between the tools and the tools received in the work spindles, together with a compact and cost-effective construction of the machine tool and a machining space which the machinist or operator of the machine tool can see into as easily as possible.

SUMMARY OF THE INVENTION

To achieve the stated object, the present invention proposes a machine tool according to independent claim 1. The dependent claims relate to preferred embodiments of the machine tool according to the present invention.

The invention proposes a machine tool, in particular a lathe, which comprises a machine frame comprising a first carrier portion having a first tool carrier face, comprising a second carrier portion having a second tool carrier face, and comprising a central portion arranged between the first and the second carrier portion and having a third tool carrier face. The first tool carrier face of the first carrier portion and the second tool carrier face of the second carrier portion are arranged on the same, first face of the machine frame, and the third tool carrier face of the central portion is arranged on a second face of the machine frame, arranged substantially perpendicularly or obliquely with respect to the first face of the machine frame.

According to the invention, the machine tool further comprises a first work spindle, arranged on the first carrier portion, for receiving a first workpiece and a second work spindle, facing the first work spindle and arranged on the second carrier portion, for receiving a second workpiece. In this context, the spindle axis of the second work spindle is orientated parallel to, in particular coaxial with, the spindle axis of the first work spindle.

According to the present invention, the machine tool further comprises a first tool carrier slide, which is arranged on the first tool carrier face of the first carrier portion and on which a first tool carrier is arranged, a second tool carrier slide, which is arranged on the second tool carrier face of the second carrier portion and on which a second tool carrier is arranged, and a third tool carrier slide, which is arranged on the third tool carrier face of the central portion and on which a third tool carrier is arranged.

The third tool carrier slide is displaceable in a first direction transverse, in particular perpendicular, to the spindle axes of the first and second work spindles, and the third tool carrier is arranged between the first work spindle and the second work spindle.

The idea behind the invention is thus to configure the shape of a machine frame of the machine tool in such a way that a plurality of tool slides having tool carriers and two work spindles which are arranged coaxially, in particular parallel, can be arranged compactly, in that a first carrier portion of the machine frame carries both a first tool slide carrying a first tool carrier and a first work spindle, a second carrier portion of the machine frame carries both a second tool slide carrying a second tool carrier and a second work spindle, and a third tool slide carrying a third tool carrier is arranged on a third carrier portion, arranged between the first and second carrier portions, of the machine frame in such a way that the third tool carrier is arranged between the work spindles.

The machine tool according to the invention thus makes it possible to machine the workpieces efficiently with as many tools as possible, which have the maximum capacity for simultaneous use, since three tool carriers for machining the workpieces on the work spindles are available in a compact manner, the three separately controllable tool slides making it possible to achieve extremely high flexibility in the control of the relative movements between the tools and the tools received in the work spindles. In addition, an extremely compact and cost-effective construction of the machine tool can be provided, along with a machining space which the machinist or operator of the machine tool can see into very well.

Preferably, the first and/or second work spindle can be displaced in the direction of the spindle axes. This advantageously makes it possible for workpieces to pass over from one spindle to the other, for example if the front and rear faces of the same workpiece are machined in succession on the two work spindles.

Preferably, the first tool carrier face of the first carrier portion and the second tool carrier face of the second carrier portion substantially span a first plane, and the third tool carrier face of the central portion preferably substantially spans a second plane aligned perpendicularly or obliquely with respect to the first plane. In this way, a particularly expedient construction of the machine frame can be provided, having two mutually perpendicular or oblique planes, in which each of the planes can be used as a tool carrier face for arranging tool slides which carry tool carriers. In this context, for example the face of the machine frame in one plane on the first and second carrier portions can optionally be used as a spindle carrier face, and the face of the machine frame in the other plane on the first and second carrier portions can be used as a tool carrier face for the first and/or third tool carrier slides. It is not necessarily obligatory for the base body of the machine frame to have precisely planar faces which span the aforementioned planes. Rather, the aforementioned planes may be understood more abstractly as geometric planes which substantially correspond to the faces of the machine frame or are substantially spanned by the respective faces of the machine frame, or at least in which the displacement planes of the slides, formed or spanned for example by guide rails of the slides, are positioned.

In accordance with a particularly expedient embodiment, the second plane is indented towards the machine frame with respect to faces, arranged on the second face of the machine frame, of the first and second carrier portions. In this way, in a particularly expedient and compact manner, a machine frame construction or machine frame structure can be provided in which the third tool slide for the third tool carrier can be compactly arranged in a depression between the work spindles or between the carrier portions of the machine frame. In addition, a machining space which is easy to see into and which is open in a viewing direction or open on one side can be created between the carrier portions in a simple and compact manner. This machining space may particularly advantageously be defined on three sides by faces of the first, central and second carrier portions respectively. If the carrier portions are aligned vertically, the spindle axes being aligned horizontally and the first direction extending substantially vertically between the carrier portions, a particularly expedient collection channel for chips can further be created below the work spindles and the tool carrier in this construction. In this context, a face of the first carrier portion facing the second carrier portion, the third tool carrier face of the central portion, and a face of the second carrier portion facing the first carrier portion preferably form the machining space in the machine frame. In this way, a machining space which is easy to see into and which is open in a viewing direction or open on one side can be created between the carrier portions in a simple and compact manner.

In a preferred embodiment, the first work spindle is arranged on the first tool carrier face of the first carrier portion and/or the second work spindle is arranged on the second tool carrier face of the first carrier portion. In accordance with an alternative preferred embodiment, the first work spindle is arranged on a first spindle carrier face of the first carrier portion and/or the second work spindle is arranged on a second spindle carrier face of the second carrier portion. In accordance with this alternative preferred embodiment, the first spindle carrier face and the second spindle carrier face may preferably be arranged on the same, second face of the machine frame as the third tool carrier face.

In this embodiment, the first spindle carrier face of the first carrier portion and the second spindle carrier face of the second carrier portion preferably substantially span a third plane, in such a way that the first plane is aligned substantially perpendicularly or obliquely with respect to the third plane. In this case, it is expedient to provide a machine frame construction in which the second plane is aligned parallel to the third plane, the second plane being indented towards the machine frame with respect to the third plane. In this way, in a particularly expedient and compact manner, a machine frame construction or machine frame structure can be provided in which the third tool slide for the third tool carrier can be compactly arranged in a depression or recess (which may optionally advantageously define a machining space in the machine frame, as disclosed above) between the work spindles or between the carrier portions of the machine frame.

In addition, a machining space which is easy to see into and which is open in a viewing direction or open on one side can be created between the carrier portions in a simple and compact manner. If the carrier portions are aligned vertically, the spindle axes being aligned horizontally and the first direction extending substantially vertically between the carrier portions, a particularly expedient collection channel for chips can further be created below the work spindles and the tool carrier in this construction.

In further expedient embodiments of the present invention, the third tool carrier slide is guided on guides, in particular guide rails, which are arranged or fixed on the third tool carrier face of the central portion of the machine frame and aligned in the first direction.

Preferably, the first and/or second tool carrier slides are displaceable parallel or transverse, in particular perpendicular, to the spindle axes. In this way, the possibilities for relative controllable movement between the tools and the workpieces can be further improved. In this context, the first and/or second tool carrier slides may preferably be in the form of compound slides comprising two partial slides or double compound slides having three partial slides.

Preferably, the first and/or second tool carriers are displaceable in the first direction transverse to the spindle axes, in a second direction transverse to the first direction and transverse to the spindle axes and/or in a third direction parallel to the spindle axes. In this way, the possibilities for relative controllable movement between the tools and the workpieces can be even further improved. In this context, the first and/or second tool carrier slides may preferably be in the form of compound slides having two partial slides or double compound slides having three partial slides.

Preferably, the first and/or second tool carrier is in the form of a tool turret, which comprises a tool-carrying turret head mounted rotatably about a turret axis aligned parallel to the spindle axes. Alternatively or in addition, the third tool carrier preferably comprises at least one tool turret. Since each turret is set up so as to provide a plurality of tools, the provision of tools on the machine tool can be even further improved in this manner.

Preferably, the first and second tool carriers are arranged substantially on the same side of the spindle axes. In this way, the construction of the machine tool can further, advantageously, be made even more compact.

BRIEF DESCRIPTION OF THE DRAWINGS

FIG. 6A to 6E are further exemplary schematic details of the machining space of the machine tool in accordance with the first preferred embodiment of the present invention from FIG. 2, illustrating how the third tool carrier can be orientated.

DETAILED DESCRIPTION OF PREFERRED EMBODIMENTS OF THE PRESENT INVENTION

Figure 1:
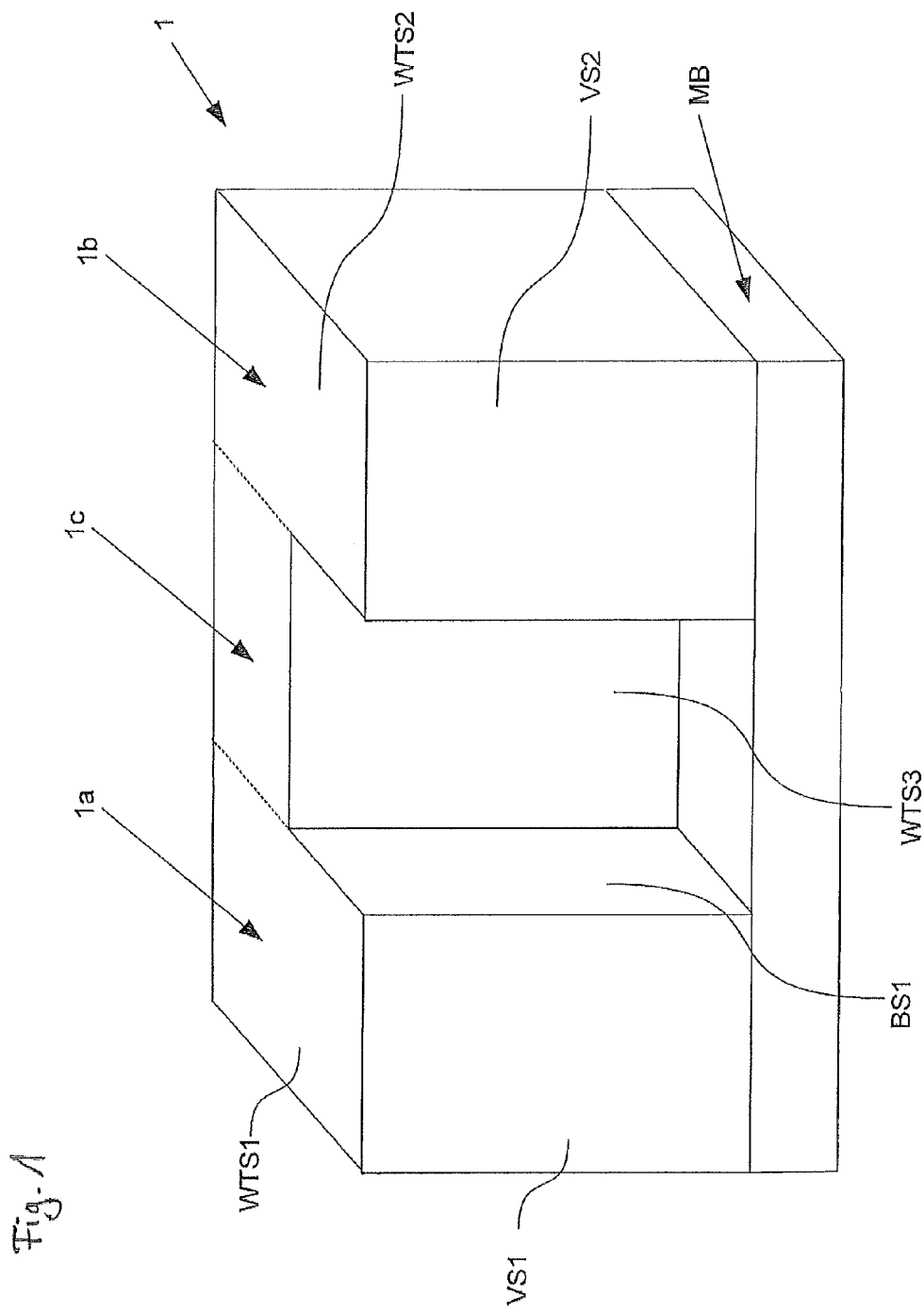
FIG. 1 is an exemplary schematic perspective view of the machine frame construction of a machine tool in accordance with a preferred embodiment of the present invention.

In the following, preferred embodiments of the present invention are disclosed in detail, referring to the appended drawings. However, the present invention is not limited to the disclosed embodiments. The present invention is defined by the scope of the patent claims. Like or similar features of the embodiments are denoted by like reference numerals in the drawings.

FIG. 1 is an exemplary schematic perspective view of the machine frame construction of the machine tool in accordance with a preferred embodiment of the present invention. As is shown in FIG. 1, the first carrier portion 1a comprises by way of example a first front face VS1 and a first tool carrier face WTS1, which are positioned substantially in mutually perpendicular planes. Analogously to the first carrier portion 1a, the second carrier portion 1b comprises by way of example a second front face VS2 and a second tool carrier face WTS2, which are positioned substantially in mutually perpendicular planes.

According to FIG. 1, the first tool carrier face WTS1 of the first carrier portion 1a and the second tool carrier face WTS2 of the second carrier portion 1b substantially span a first plane, and the first front face VS1 of the first carrier portion 1a and the second front face V2 of the second carrier portion 1b substantially span a second plane, the first plane being aligned for example substantially perpendicular to the second plane. In other embodiments, the first plane may also be aligned obliquely with respect to the second plane.

In accordance with the embodiment of FIG. 1, the first tool carrier face WTS1 of the first carrier portion 1a and the second tool carrier face WTS2 of the second carrier portion 1b are arranged on the upper face of the machine frame 1, and the first front face VS1 of the first carrier portion 1a and the second front carrier face VS2 of the second carrier portion 1b are arranged on the front face of the machine frame 1. On the lower face, the machine frame comprises a machine base portion MB, which comprises a footprint of the machine tool. In other embodiments, the machine frame may also be orientated differently, for example in such a way that the tool carrier faces WTS1 and WTS2 are arranged on the front or rear face of the frame 1.

The central portion 1c, arranged between the carrier portions 1a and 1b, of the machine frame 1 comprises a third tool carrier face WTS3. The third tool carrier face WTS3 of the central portion 1c substantially spans a third plane, which is aligned substantially parallel to the second plane of the first and second front faces VS1 and VS2, the third plane being indented towards the machine frame 1 with respect to the second plane of the first and second front faces VS1 and VS2, i.e. in particular displaced in a parallel manner towards the machine frame 1.

The first tool carrier face WTS1 of the first carrier portion 1a and the second tool carrier face WTS2 of the second carrier portion 1b are by way of example arranged on the upper face of the machine frame 1, and the first front face VS1 of the first carrier portion 1a, the second front face VS2 of the second carrier portion 1b, and the third tool carrier face WTS3 of the central portion 1c are by way of example arranged on the front face of the machine frame 1 from which the machinist looks into the machining space. The machining space is defined in that the central carrier portion 1c between the first and second carrier portions 1a and 1b is indented towards the machine frame 1, in such a way that a machining space is created which is open towards the front (in a direction transverse to the second plane).

Respective machining space faces BS1 and BS2 (see for example face BS1 in FIG. 1; see also FIG. 2) extend between the first and second front faces VS1 and VS2 of the carrier portions 1a and 1b and the third tool carrier face WTS3 of the central portion 1c, and are aligned by way of example perpendicular to the first plane of the first and second tool carrier faces WTS1 and WTS2 of the carrier portions 1a and 1b and transverse, in particular perpendicular, to the second plane of the first and second front faces VS1 and VS2 of the carrier portions 1a and 1b. The machining space faces, together with the third tool carrier face WTS3, define an indentation in the machine frame 1, which can advantageously define the machining space on the machine tool, and additionally, in a vertical orientation as in FIG. 1, a collection channel for chips (see embodiments according to FIG. 2 and FIG. 8).

In this embodiment according to FIG. 1, the carrier portions 1a to 1c are interconnected, but they may also be provided mutually separated in other embodiments of the invention.

First Embodiment

Figure 2:
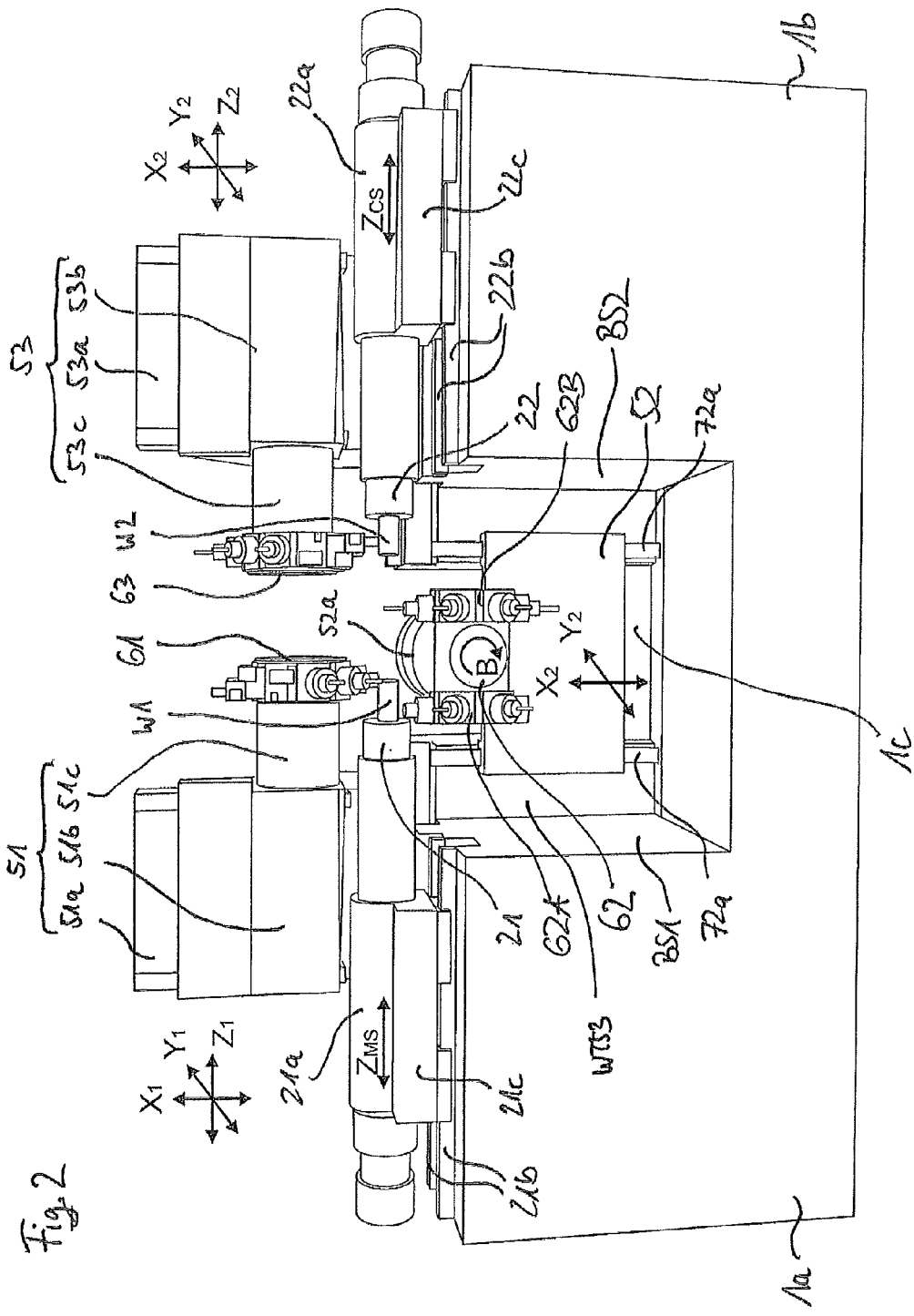
FIG. 2 is an exemplary schematic front view of a machine tool in accordance with a first preferred embodiment of the present invention.

FIG. 2 is an exemplary schematic front view of a machine tool in accordance with a first embodiment of the present invention. The machine tool according to FIG. 1 is a lathe having a machine frame 1, which comprises a first carrier portion 1a, a second carrier portion 1b, and a central portion 1c arranged between the first and second carrier portions 1a and 1b, as is shown schematically in FIG. 1. In accordance with this embodiment, the spindles 21 and 22 are by way of example respectively arranged on the tool slide faces WTS1 and WTS2 of the first and second carrier portions 1a and 1. However, the spindles 21 and 22 may also be arranged on the front faces VS1 and VS2 in other embodiments of the invention.

The machine tool according to FIG. 2 comprises a first work spindle 21, arranged on the first tool slide face WTS1 of the first carrier portion 1a and held on a spindle housing 21a, for receiving a first workpiece W1, and a second work spindle 22, facing the first work spindle 21 and arranged on the second tool slide face WTS2 of the second carrier portion 1b, for receiving a second workpiece W2. The second work spindle 22 is held on a spindle housing 22a.

In this embodiment, the spindle axis of the second work spindle 22 is aligned coaxially with the spindle axis of the first work spindle 21, but it may also be aligned parallel but not coaxially, or be aligned parallel and be able to be aligned coaxially as a result of displacement.

In this embodiment, the first work spindle 21 is arranged in the spindle housing 21a on a spindle slide 21c guided on guides 21b and is displaceable in direction Z ($Z_{MS}$, MS standing for "main spindle") parallel to the spindle axes, and the second work spindle 22, which is guided in the spindle housing 22a on a spindle slide 22c guided by guides 22b, is also displaceable in direction Z ($Z_{CS}$, CS standing for "counter spindle") parallel to the spindle axes. In other embodiments, it is also possible for only the first or the second work spindle to be displaceable in direction Z.

In this embodiment, the guides 21b and 22b extend by way of example on the first tool slide face WTS1 of the first carrier portion 1a and on the second tool carrier face WTS2 of the second carrier portion 1b, but alternatively they may also be arranged on the front faces VS1 and VS2 respectively or on projecting portions of the machine frame 1 which can be arranged on the front faces VS1 and VS2 respectively.

The machine tool further comprises a first tool carrier slide 51, which is arranged on the first tool carrier face WTS1 of the first carrier portion 1a and on which a first tool carrier 61 is arranged, and a second tool carrier slide 53, which is arranged on the second tool carrier face WTS2 of the second carrier portion 1b and on which a second tool carrier 63 is arranged.

In this embodiment, the first and second tool carriers 61 and 63 are in the form of tool turrets, which each comprise a tool-carrying turret head rotatably mounted about a turret axis aligned parallel to the spindle axes. However, instead of a tool turret, it is also possible for example to provide a milling/drilling spindle having a tool mount for the first and/or second tool carrier 61, 63.

According to the invention, in the embodiment shown in FIG. 2, a third tool carrier slide 52 is provided, which is arranged on the third tool carrier face WTS3 of the central portion 1c and on which a third tool carrier 62 is arranged. The third tool carrier slide 52 is displaceable in the vertical direction X2 in FIG. 2 and in particular perpendicular to the spindle axes of the first and second work spindles 21 and 22. For this purpose, guides 72a are arranged on the third tool carrier face WTS3 and are aligned transverse to the spindle axes in the vertical direction X2. By means of a linear shaft (for example in the form of a telescopic shaft), arranged on the third tool carrier slide 52, in a housing 52a, the third tool carrier 62 is additionally displaceable in a further direction Y2 transverse to the spindle axes and transverse to the direction X2.

In particular, the third tool carrier 62 is formed in such a way that it comprises two tool turrets having respective turret heads 62A and 62B, which are arranged between the first work spindle 21 and the second work spindle 22. Each of the turret heads 62A and 62B is mounted rotatably about a respective turret axis on the tool carrier 62. In this embodiment, the turret axes of the turret heads 62A and 62B are by way of example aligned coaxially.

The housing 52a further comprises a rotary shaft drive for a rotary shaft B, by means of which the third tool carrier 62 can be rotated about an axis aligned transverse to the spindle axes and parallel to the direction Y2 or transverse to the direction X2. In this context, the turret heads 62A and 62B are arranged in such a way that the turret axes are aligned transverse to the rotary shaft B. Further, the turret heads 62A and 62B are arranged on the third tool carrier 62 on faces which are respectively opposed with respect to the rotary shaft B.

Figure 3:
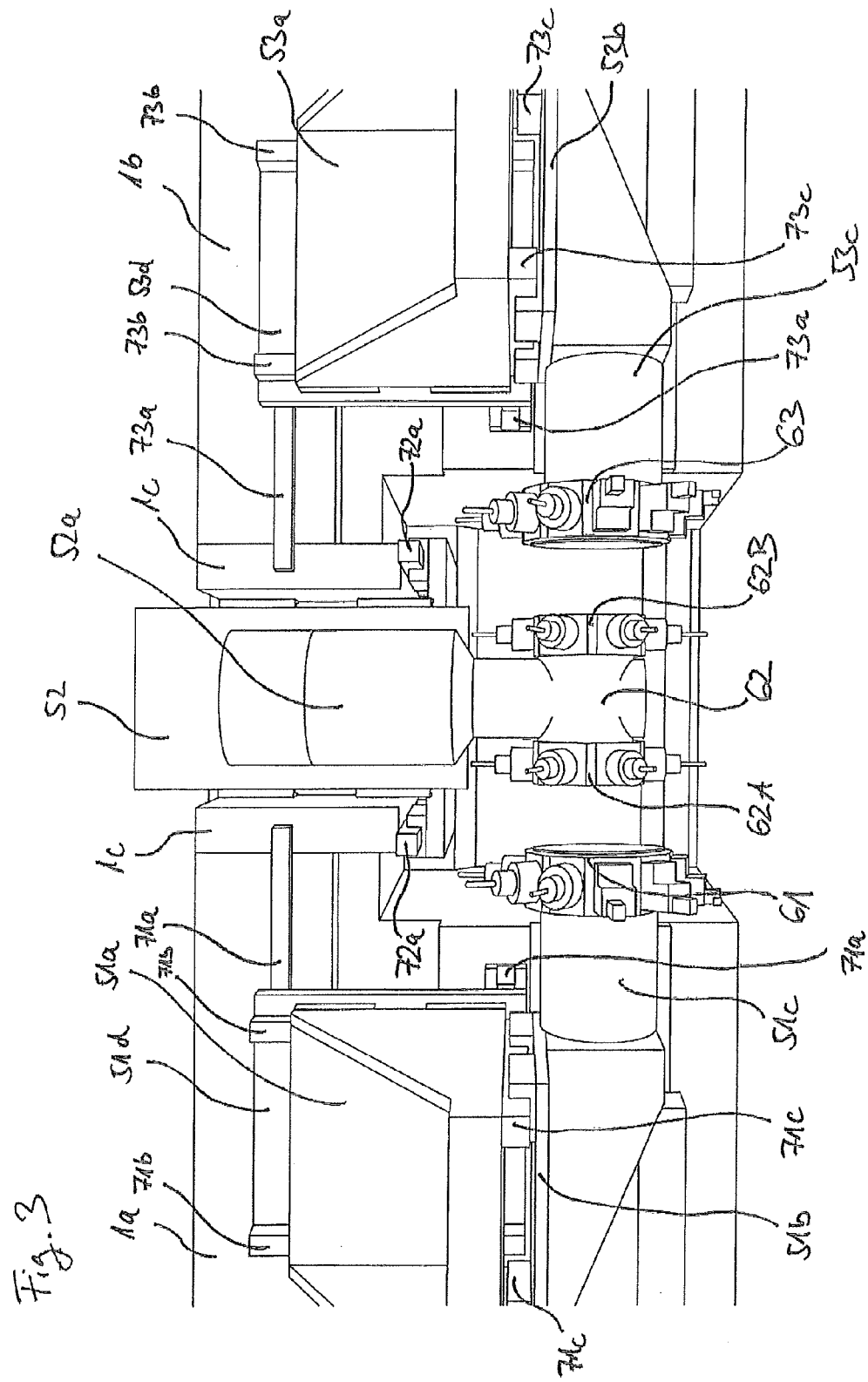
FIG. 3 is an exemplary schematic plan view of the machine tool in accordance with the first preferred embodiment of the present invention from FIG. 2.

FIG. 3 is an exemplary schematic plan view of the machine tool in accordance with the first preferred embodiment of the present invention from FIG. 2. In this context, in particular the construction of the tool carrier slides 51 and 52 is shown.

The first tool carrier slide 51 is configured as a double compound slide comprising three partial slides 51d, 51a and 51b, the partial slide 51d being arranged on the first carrier portion 1a of the machine frame 1 and guided on the guides 71a, which are arranged parallel to the spindle axes on the first tool carrier face WTS1 of the first carrier portion 1a. The partial slide 51d is thus displaceable in a direction Z1 (see also FIG. 2). Guides 71b are arranged on the partial slide 51d, which extend transverse to the spindle axes and on which the partial slide 51a is displaceably guided in direction Y1 (see also FIG. 2). Guides 71c are arranged on the partial slide 51a, which extend transverse to the spindle axes and transverse to the direction Y1 of the guides 71b and on which the partial slid 51b is guided displaceably in direction X1 (see also FIG. 2). Finally, a housing 51c is held on the partial slide 51b, extends into the machining space parallel to the spindle axes, and has the first tool carrier 61 held on the end thereof. As a result of this construction, the first tool carrier 61 can be displaced in three orthogonal directions X1, Y1 and Z1.

In accordance with this embodiment, the second tool carrier slide 53 is also configured as a double compound slide comprising three partial slides 53d, 53a and 53b, the partial slide 53d being arranged on the second carrier portion 1b of the machine frame 1 and being guided on guides 73a which are arranged parallel to the spindle axes on the second tool carrier face WTS2 of the second carrier portion 1b. The partial slide 53d is thus displaceable in a direction Z3 (see also FIG. 2). Guides 73b are arranged on the partial slide 53d, which extend transverse to the spindle axes and on which the partial slide 53a is guided displaceably in direction Y3 (see also FIG. 2). Guides 73c are arranged on the partial slide 53a, which extend transverse to the spindle axes and transverse to the direction Y3 of the guides 73b and on which the partial slide 53b is guided displaceably in direction X3 (see also FIG. 2). Finally, a housing 53c is held on the partial slide 53b, extends into the machining space parallel to the spindle axes and has the second tool carrier 63 held on the end thereof. As a result of this construction, the second tool carrier 63 can be displaced in three orthogonal directions X3, Y3 and Z3.

Figure 4:
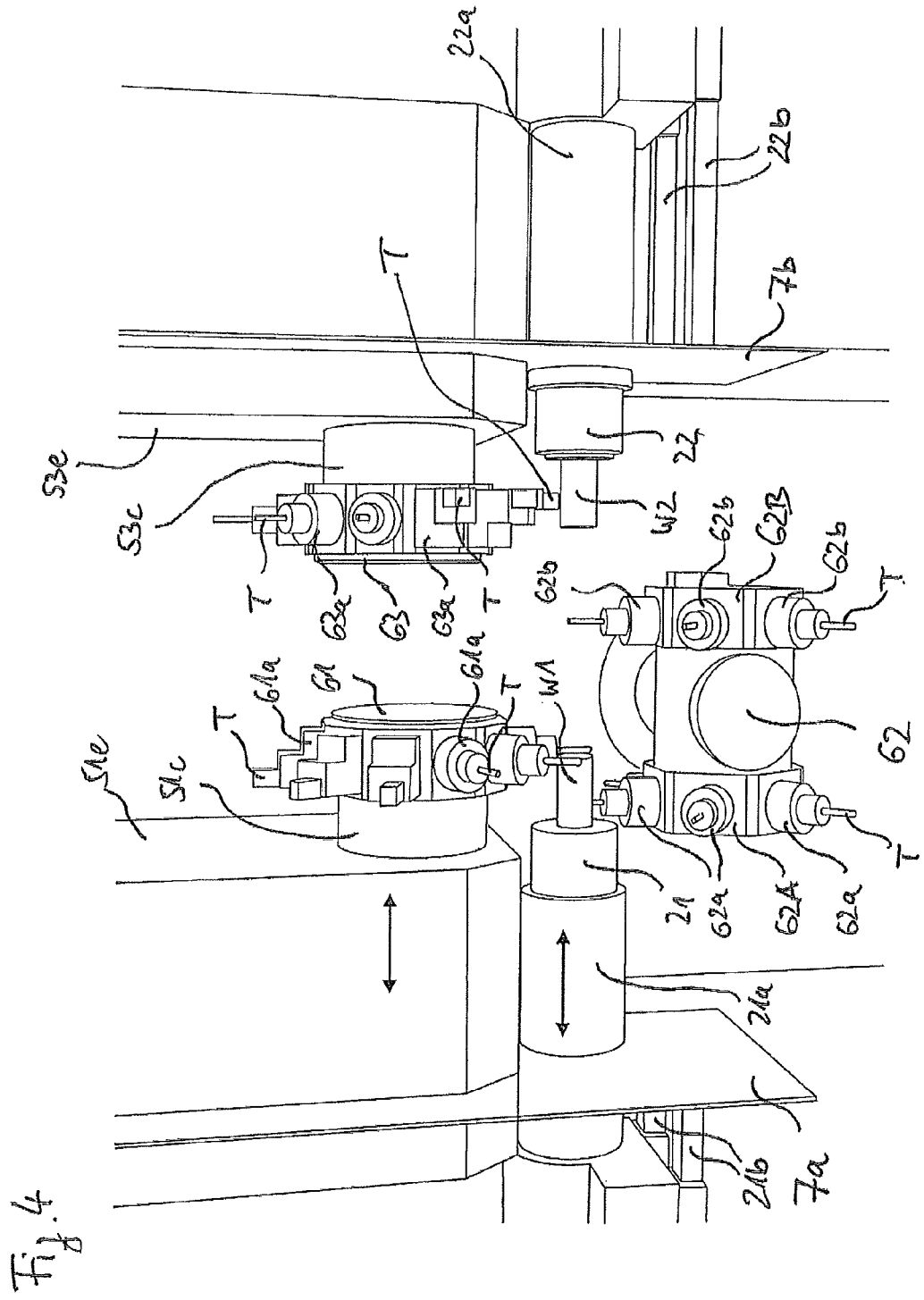
FIG. 4 is an exemplary schematic detail of the machining space of the machine tool in accordance with the first preferred embodiment of the present invention from FIG. 2.

FIG. 4 is an exemplary schematic detail of the machining space of the machine tool in accordance with the first preferred embodiment of the present invention from FIGS. 2 and 3.

As described above, in this embodiment the first and second tool carriers are in the form of a tool turret comprising respective turret heads 61 and 63. In this context, the turret heads 61 and 63 are aligned in such a way that the turret axes are aligned mutually parallel and parallel to the spindle axes. A plurality of tool holders 61a are arranged on the turret head 61 of the first tool carrier circumferentially around the turret axis, and are each set up to hold tools T for machining a workpiece. By rotating the turret head 61 about the turret axis, the respective tool holders 61a can be aligned with the first work spindle 21, so as to machine a workpiece W1 held therein. A drive for the tool turret may be arranged in the housing 51c. Analogously, a plurality of tool holders 63a are arranged on the turret head 63 of the second tool carrier circumferentially about the turret axis, and are each set up to hold tools T for machining a workpiece. By rotating the turret head 63 about the turret axis, the respective tool holders 63a can be aligned with the second work spindle 22, so as to machine a workpiece W2 held therein. A drive for the tool turret may be arranged in the housing 53c.

A plurality of tool holders 62a are arranged on the turret head 62A of the third tool carrier 62 circumferentially about the turret axis, and are each set up to hold tools T for machining a workpiece. By rotating the turret head 62A about the turret axis, the respective tool holders 62a can be aligned with the first work spindle 21 (or else with the second work spindle 22), so as to machine a workpiece W1 or W2 held therein. In FIG. 4, a tool on the tool turret 62A is by way of example aligned with the first work spindle 21, in such a way that the workpiece W1 held therein can be machined both by a tool on the tool turret 62A and also simultaneously by a tool on the tool turret 61. At the same time, a workpiece W2 held on the second work spindle 22 can be machined by a tool on the tool turret 63.

A plurality of tool holders 62b are arranged on the turret head 62B of the third tool carrier 62 circumferentially around the turret axis, and are each set up to hold tools T for machining a workpiece. By rotating the turret head 62B about the turret axis, the respective tool holders 62b can be aligned with the second work spindle 22 (or else with the first work spindle 21), so as to machine a workpiece W2 or W1 held therein. In FIG. 4, the second work spindle 22 may for example be displaced further into the machining space together with the tool carrier 63, in such a way that, by means of the tool carrier 63, the workpiece W1 held on the first work spindle 21 can be machined by a tool on the tool turret 62A and the workpiece W2 held on the second work spindle 22 can also be machined by a tool on the tool turret 62B simultaneously. In this way, it is advantageously even possible to machine two workpieces W1 and W2 using a construction having only three compactly arranged tool carriers 61, 62 and 63 on only three compact slide systems 51, 52 and 52 simultaneously, with two tools in each case.

For this purpose, this embodiment is also expedient and advantageous specifically because a respective double degree of freedom of displacement parallel to the spindle axes is provided for each spindle. Specifically, the first tool carrier 61 and first work spindle 21 and the second tool carrier 63 and second work spindle 22 can each be displaced in the direction parallel to the spindle axes mutually independently (see for example the two arrows in FIG. 4 for the spindle 22 and tool carrier 61, or directions $Z_{MS}$ and Z1 or $Z_{CS}$ and Z3 in FIG. 2). In this way, the relative positioning, in the direction of the spindle axes, between the workpiece W1 on the first work spindle 21 and a tool on the turret 62A of the third tool carrier 62 can be controlled by means of the $Z_{MS}$ displaceability of the spindle 21, whilst the relative positioning, in the direction of the spindle axes, between the workpiece W1 on the first work spindle 21 and a tool on the first tool carrier 61 can be controlled by means of the Z1 displaceability of the first tool carrier 61. Analogously, the relative positioning, in the direction of the spindle axes, between the workpiece W2 on the second work spindle 22 and a tool on the turret 62B of the third tool carrier 62 can be controlled by means of the $Z_{CS}$ displaceability of the spindle 22, whilst the relative positioning, in the direction of the spindle axes, between the workpiece W2 on the second work spindle 22 and a tool on the second tool carrier 63 can be controlled by means of the Z3 displaceability of the second tool carrier 63.

Figure 5:
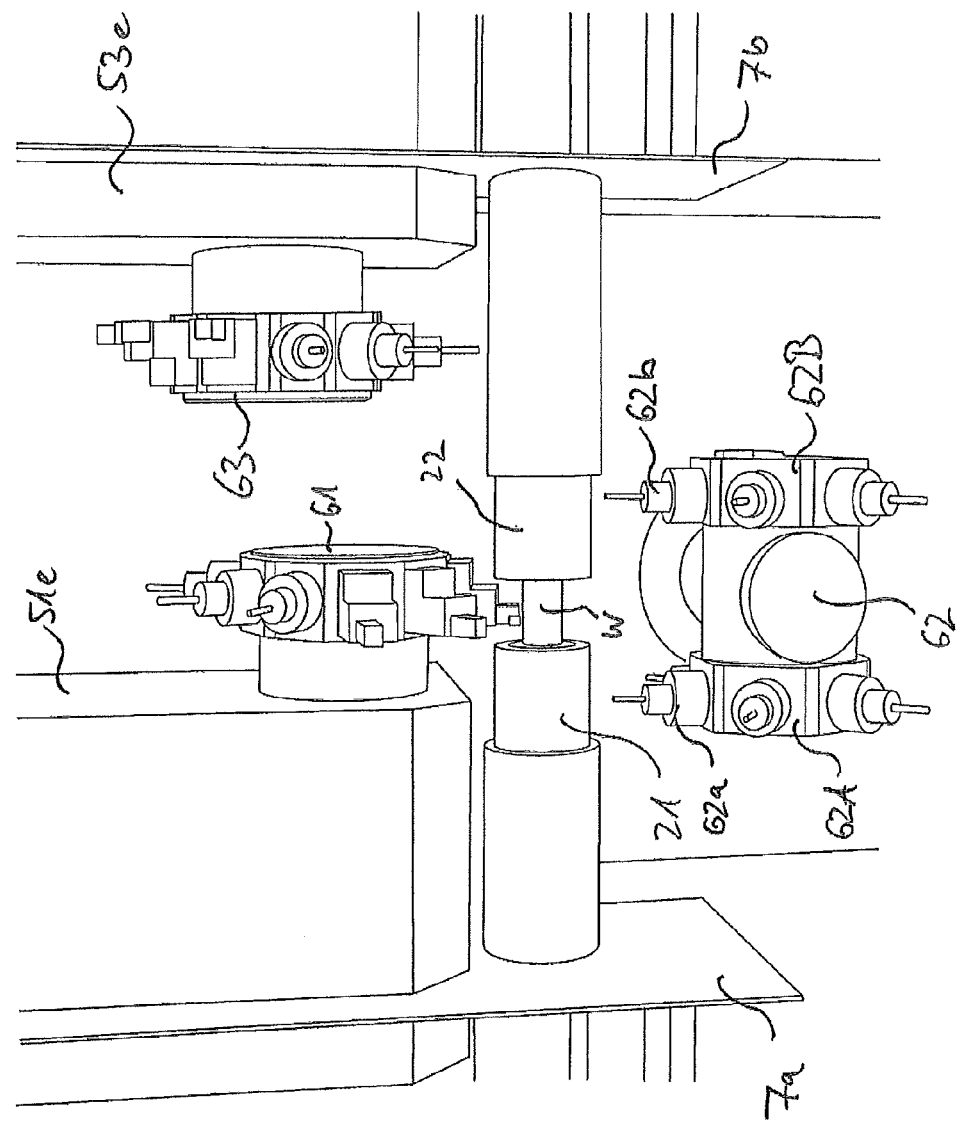
FIG. 5 is a further exemplary schematic detail of the machining space of the machine tool in accordance with the first preferred embodiment of the present invention from FIG. 2.

FIG. 5 is a further exemplary schematic detail of the machining space of the machine tool in accordance with the first preferred embodiment of the present invention from FIG. 2. In this drawing, a workpiece W is received on the two work spindles 21 and 22 simultaneously and a tool of the first tool carrier 61 can be used to split the workpiece W into workpieces W1 and W2, which are subsequently received on the first and second work spindles 21 and 22 respectively and can be machined mutually independently, for example in accordance with the arrangement from FIG. 4. FIG. 5 shows by way of example optional additional coverings 51a and 53e which can be used for covering the tool carrier slides 51 and 53 and protecting them from chips.

FIG. 6A to 6D are further exemplary schematic details of the machining space of the machine tool in accordance with the first preferred embodiment of the present invention from FIG. 2, illustrating how the third tool carrier 62 can be orientated.

In this context, the particularly expedient configuration of the third tool carrier 62 in this embodiment of the present invention can be seen. In this context, the arrangement according to FIG. 6A substantially corresponds to the arrangement according to FIG. 4. As a result, as disclosed above, the two workpieces W1 and W2 can each be machined simultaneously on the respective work spindles 21 and 22 by means of two tools of the tool carrier 62, in each case by one tool on the turret 62A and one tool on the turret 62B.

Figure 6A:
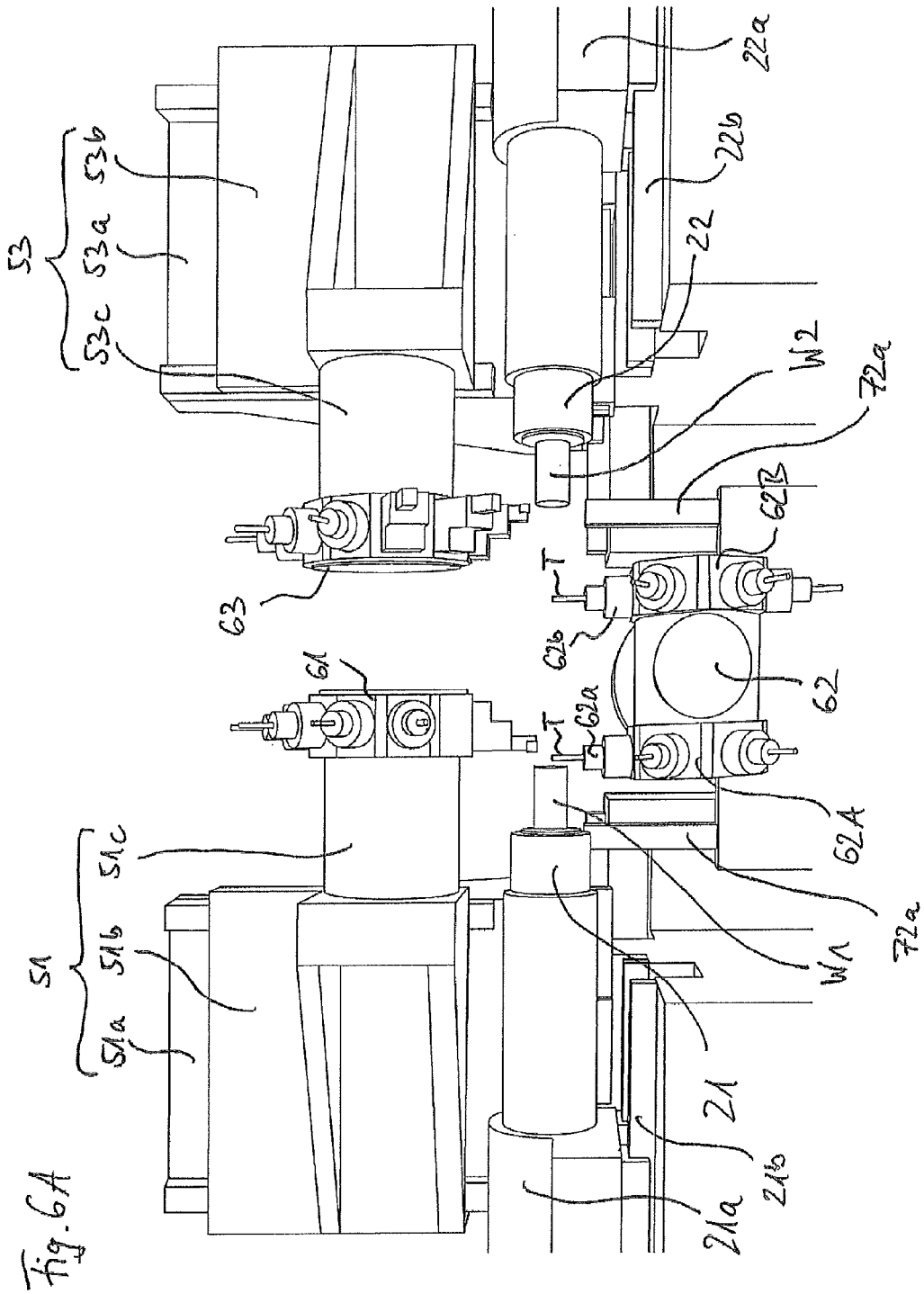
Figure 6D:
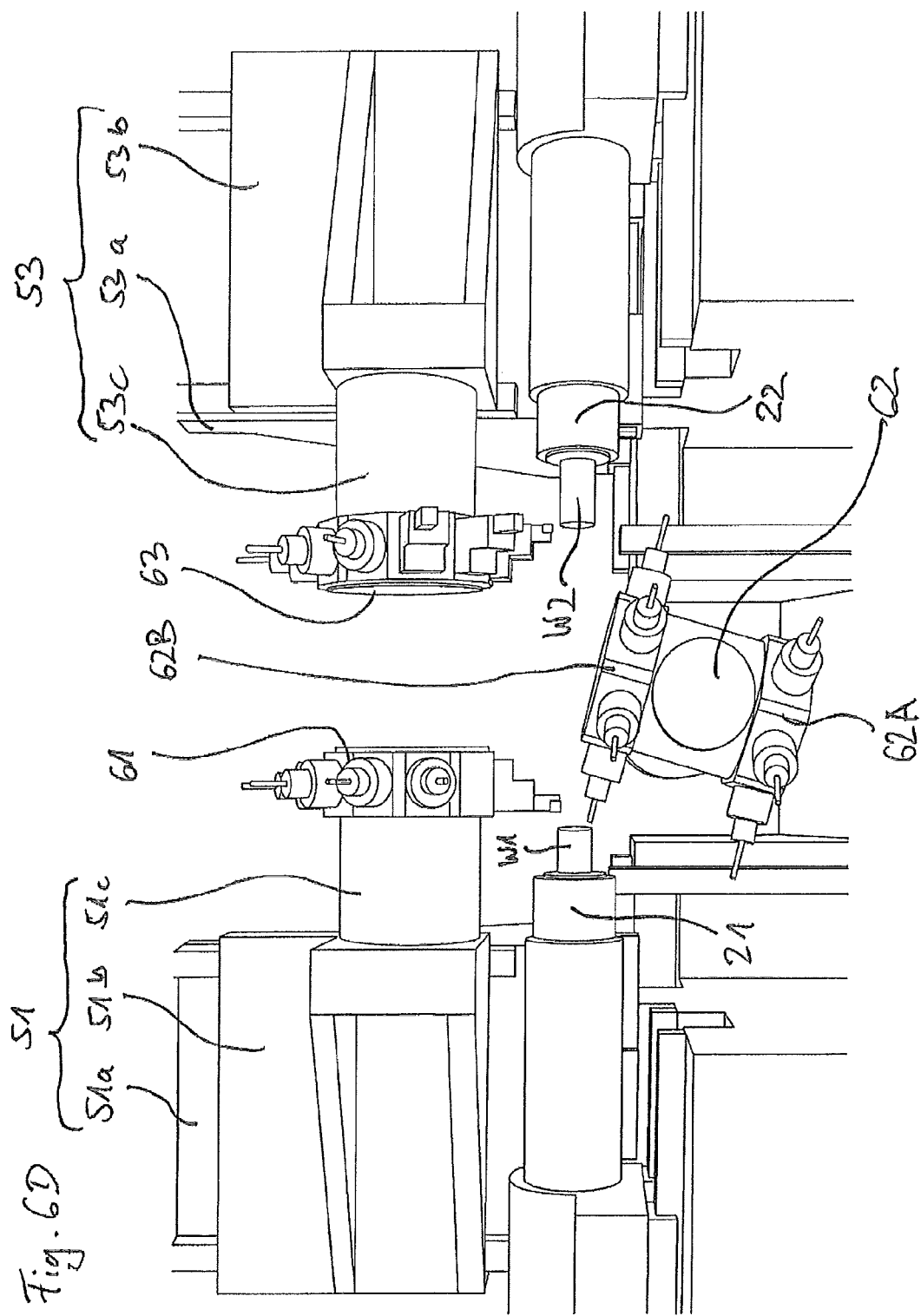
Figure 6E:
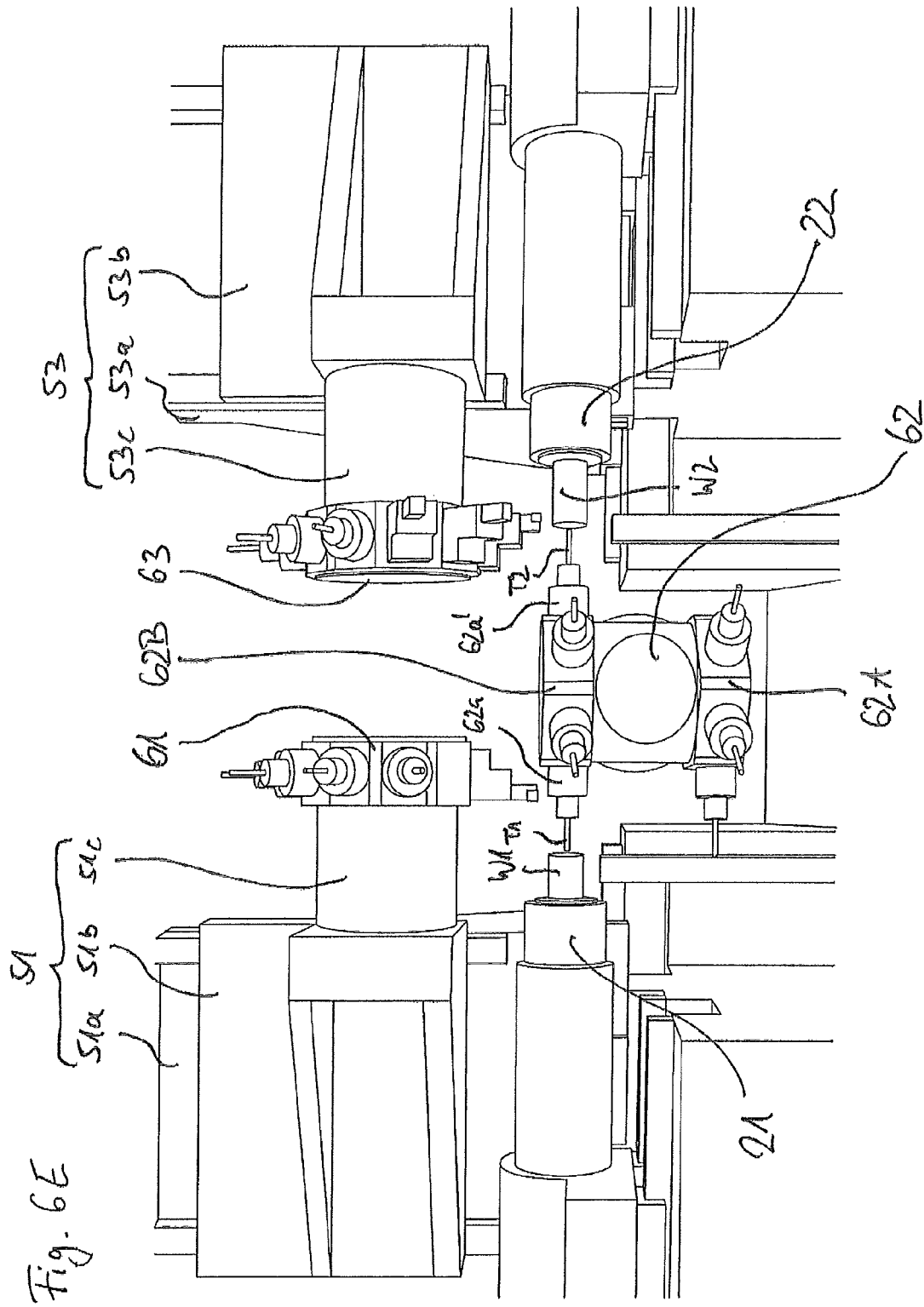

As a result of the advantageous configuration of the tool carrier 62 comprising two coaxially arranged turret heads 62A and 62B on opposite sides of the rotary shaft B of the tool carrier 62, the turret axis of the turret heads 62A and 62B being rotated with respect to the orientation of the spindle axes in such a way that it is possible to transition virtually continuously from radial machining of the workpiece W1 in accordance with FIG. 6A by means of a tool T on the turret head 62A to axial machining of the workpiece W1 in accordance with FIG. 6E by means of a tool T1 on the turret head 62B.

In this context, the orientation of the turret axes of the turrets 62A and 62B with respect to the spindle axes is by way of example 0° in FIG. 6A, 15° in FIG. 6B, 45° in FIG. 6C, 75° in FIG. 6D and finally 90° in FIG. 6E. In this context, between the orientations in accordance with FIGS. 6C and 6D, there is by way of example a transition from machining using a tool on the tool turret 62A to machining using a tool on the tool turret 62B by displacing the tool carrier downwards in direction X2, so as to give the tool carriers 61 and 63 more space for machining. These would otherwise have to be displaced upwards in direction X1 or X3, and would no longer be able to be involved in machining the workpieces W1 and W2.

FIG. 6E further shows that the configuration of the third tool carrier 62, in accordance with which the turret axis of the workpiece turret 62B (or 62A) can be aligned transverse to the spindle axes, has the further advantage that the workpieces W1 and W2 held on the two work spindles 21 and 22 can also further be machined simultaneously in the axial direction by tools T1 and T2 on the turret 62B of the third tool carrier 62 (similarly to the second embodiment disclosed below).

Thus, in accordance with this particularly expedient embodiment, according to FIG. 6A a first arrangement can thus be provided in which the turret axes of the tool turrets 62A and 62B are orientated parallel to the spindle axes of the work spindles 21 and 22, and the workpiece W1 which is received on the first work spindle 21 can be machined radially using a tool on the tool turret 62A, whilst the workpiece W2 received on the second work spindle 22 can simultaneously be machined radially using a tool on the tool turret 62B, and further, in accordance with FIG. 6E, a second arrangement can be provided in which the turret axes of the tool turrets 62A and 62B are orientated transverse to the spindle axes of the work spindles 21 and 22, and the workpiece W1 received on the first work spindle 21 can be machined using a tool T1 on the tool turret 62B, whilst the workpiece W2 received on the second work spindle 22 can simultaneously be machined using a tool T2 on the tool turret 62B, arranged in a position opposite the tool T1 on the tool turret 62B.

Figure 7:
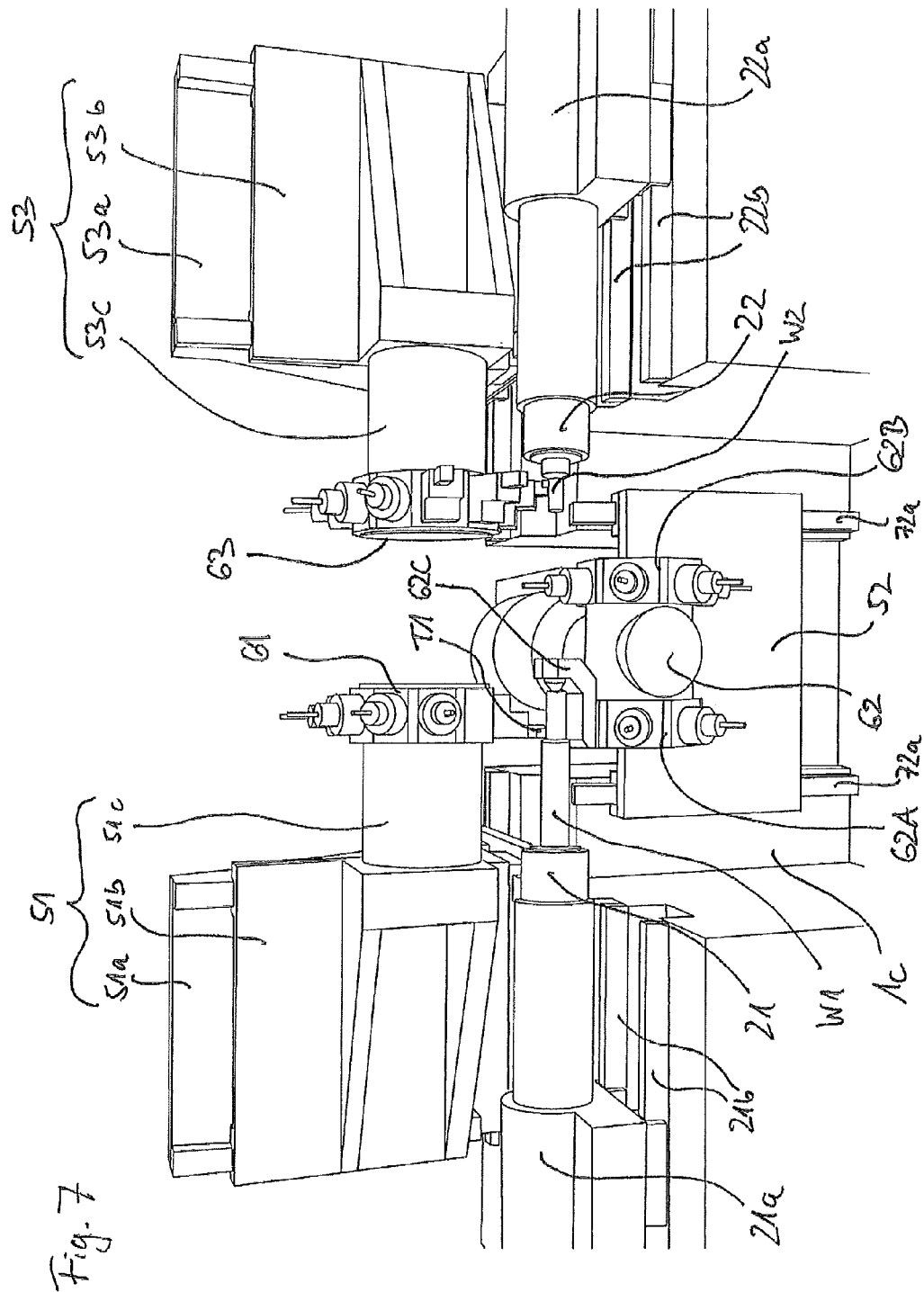
FIG. 7 is a further exemplary schematic detail of the machining space of the machine tool in accordance with the first preferred embodiment of the present invention from FIG. 2 in connection with a tailstock application.

FIG. 7 is a further exemplary schematic detail of the machining space of the machine tool in accordance with the first preferred embodiment of the present invention from FIG. 2 in connection with a tailstock application.

In this context, a tailstock 62C, comprising a centring tip by means of which an elongate workpiece W1 received on the first work spindle 21 is centred and held so as not to be bent under the pressure applied by the machining tool T1 of the first tool carrier 61, is arranged on a mount of the tool turret 62A.

Simultaneously, in this arrangement a further workpiece W2 on the second work spindle 22 may also advantageously be machined using a tool of the second tool carrier 63. By bringing the spindle 22 and the tool carrier 63 further into the machining space, the workpiece W2 can further additionally be machined simultaneously by a tool on the tool turret 62B.

Second Embodiment

Figure 8:
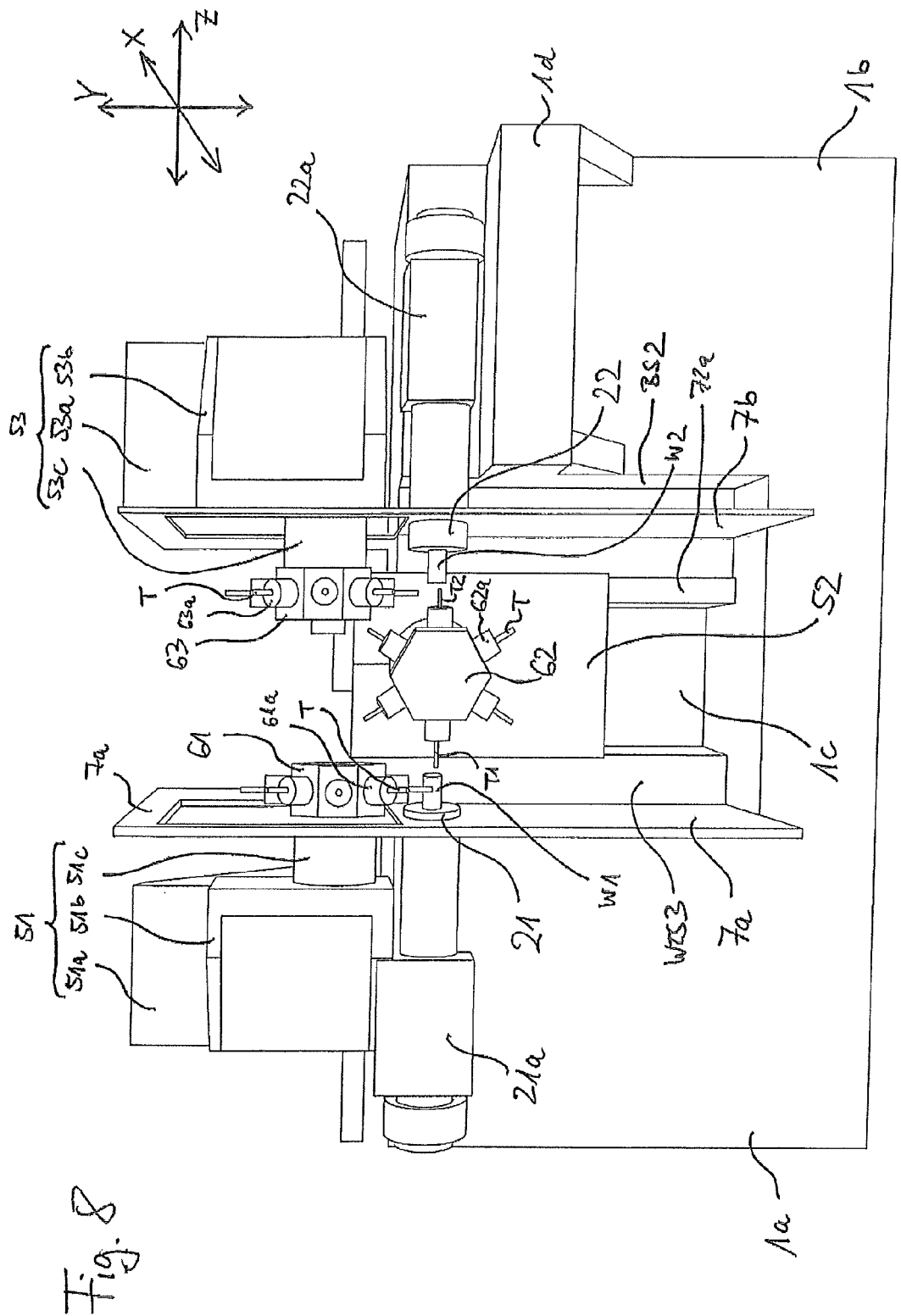
FIG. 8 is an exemplary schematic front view of a machine tool in accordance with a second preferred embodiment of the present invention.

FIG. 8 is a schematic front view of a machine tool in accordance with the second embodiment of the present invention. The machine tool according to FIG. 8 is a lathe having a machine frame 1, which comprises a first carrier portion 1a, a second carrier portion 1b, and a central portion 1c arranged between the first and second carrier portions 1a and 1b, as is shown schematically in FIG. 1. In accordance with this embodiment, the spindles 21 and 22 are by way of example respectively arranged on the front faces VS1 and VS2 of the first and second carrier portions 1a and 1b. Consequently, in the following, the first front face VS1 of the first carrier portion 1a is referred to as the first spindle carrier face and the second front face VS2 of the second carrier portion 1b is referred to as the second spindle carrier face.

The machine tool according to FIG. 8 comprises a first work spindle 21, arranged on the first spindle carrier face VS1 of the first carrier portion 1a and held on a spindle housing 21a, for receiving a first workpiece W1, and a second work spindle, facing the first work spindle 21 and arranged on the second spindle carrier face VS2 of the second carrier portion 1b, for receiving a second workpiece W2. The second work spindle 22 is held on a spindle housing 22a.

In this embodiment, the spindle axis of the second work spindle 22 is aligned coaxially with the spindle axis of the first work spindle 21, but it may also be orientated parallel but not coaxially, or be aligned parallel and be able to be aligned coaxially as a result of displacement.

In this embodiment, the second work spindle 22 is arranged on a spindle slide guided on guides and is displaceable in direction Z parallel to the spindle axes. In this embodiment, the guides (not shown) extend by way of example on the spindle carrier faces VS2 of the second carrier portion 1b, but they may also alternatively be arranged on a projecting portion 1d of the machine frame 1, which may be arranged on the spindle carrier face VS2 of the second carrier portion 1b. Analogously, embodiments may also be provided in which the first spindle 21 or both work spindles 21 and 22 are displaceable in the direction of the spindle axes.

The machine tool further comprises a first tool carrier slide 51, which is arranged on the first tool carrier face WTS1 of the first carrier portion 1a and on which a first tool carrier 61 is arranged, and a second tool carrier slide 53, which is arranged on the second tool carrier face WTS2 of the second carrier portion 1b and on which a second tool carrier 63 is arranged.

In this embodiment, the first and second tool carriers 61 and 63 are in the form of tool turrets, which each comprise a tool-carrying turret head mounted rotatably about a turret axis aligned parallel to the spindle axes. However, instead of a tool turret, it is also possible for example to provide a milling/drilling spindle with a first tool mount for the first and/or second tool carrier 61, 63.

According to the invention, in the embodiment in accordance with FIG. 8, a third tool carrier slide 52 is provided, which is arranged on the third tool carrier face WTS3 of the central portion 1c and on which a third tool carrier 62 is arranged. The third tool carrier slide 52 is displaceable in the vertical direction Y in FIG. 8 and in particular perpendicular to the spindle axes of the first and second work spindles 21 and 22.

In particular, the third tool carrier 62 is in the form of a tool turret, which is arranged between the first work spindle 21 and the second work spindle 22 and which comprises a tool-carrying turret head 62 rotatably mounted about a turret axis. The turret axis of the turret head 62 is aligned in the X direction and thus perpendicular to the spindle axes of the first and second work spindles 21 and 22, and further the turret axis of the turret head 62 is aligned perpendicular to the vertical direction Y in which the third tool carrier slide 52 is displaceable.

The turret head 62 comprises a plurality of mounts 3a, 3a' and 3a" (see for example FIG. 4) for receiving tool-holding tool holders 62a, which in turn each hold tools T. The turret head 62 is in the form of a radial turret head, the mounts 3a, 3a' and 3a" being arranged peripherally on the turret head 62. The tool turret is set up so as to align a mount 3a with one of the work spindles 21 or 22 by rotation of the turret head 62 about the turret axis, so as to align the tool T held by the tool holder 62a received on the mount 3a with one of the work spindles 21 or 22.

Figure 10:
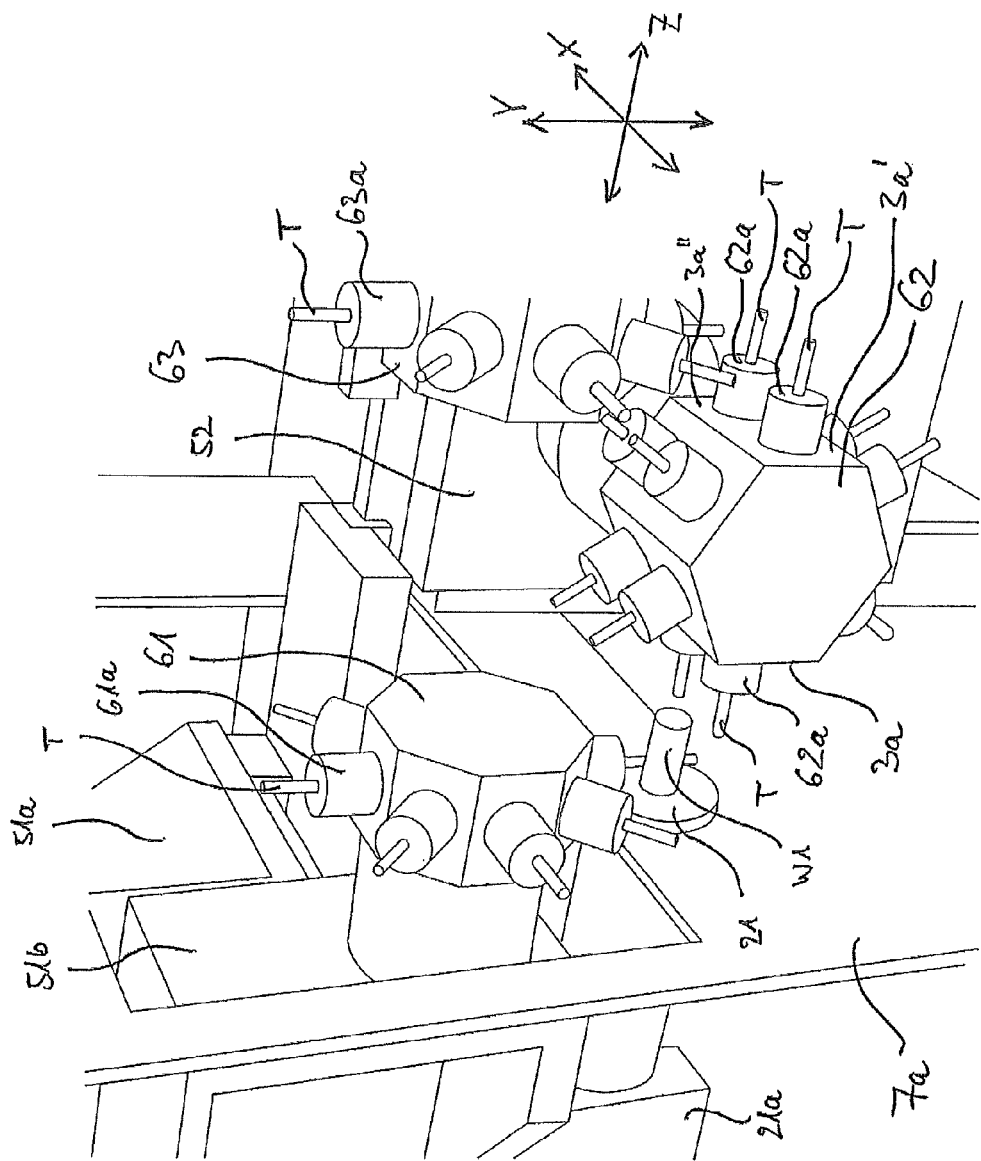
FIG. 10 is an exemplary schematic detail of the machining space of the machine tool in accordance with the second preferred embodiment of the present invention from FIG. 8.

As is shown in FIG. 8 and FIG. 10, the mounts 3a, 3a' of the turret head 62 are arranged in pairs on opposite sides of the turret head 62, in such a way that the tool holders 62a are arranged in pairs on opposite sides of the turret head 62, specifically in such a way that in each case a first mount 3a' having a tool holder 62a received therein is aligned with the second work spindle 22 when another opposite second mount 3a having a tool holder 62a received therein is aligned with the first work spindle 21.

This makes possible an advantageous simultaneous alignment of tools T with the two work spindles 21 and 22, even when using only one tool turret having a turret head 62. In FIG. 8 for example a tool T is aligned for machining towards the workpiece W1 received in the first work spindle 21 and an opposite tool T2 is aligned for machining towards the workpiece W2 received in the second work spindle 22. The workpieces T1 and T2 can thus be machined simultaneously by means of the tool turret 62 in a particularly expedient and advantageous manner.

Further, machining space walls 7a and 7b are provided in the machine tool according to FIG. 8, and are arranged on machining space faces (see for example BS1 in FIG. 8) of the carrier portion 1 which extend between the spindle carrier faces VS1 and VS2 of the carrier portions 1a and 1b and the third tool carrier face WTS3 of the central portion 1c.

The machining walls 7a and 7b advantageously form a machining space between the carrier portions 1a and 1b of the machine frame 1. Further, the machining walls 7a and 7b extend vertically upwards and horizontally forwards beyond the machine frame body.

In this context, the machining walls 7a and 7b comprise openings to the machining space, through which the first and second work spindles 21 and 22, the first tool carrier 61 and the second tool carrier 63 extend into the machining space. This advantageously makes it possible to protect the housings 21a and 22a of the work spindles and the first and second tool carrier slides 51 and 53 from chips from the machining space without requiring expensive protective coverings for the slides and housings.

Figure 9:
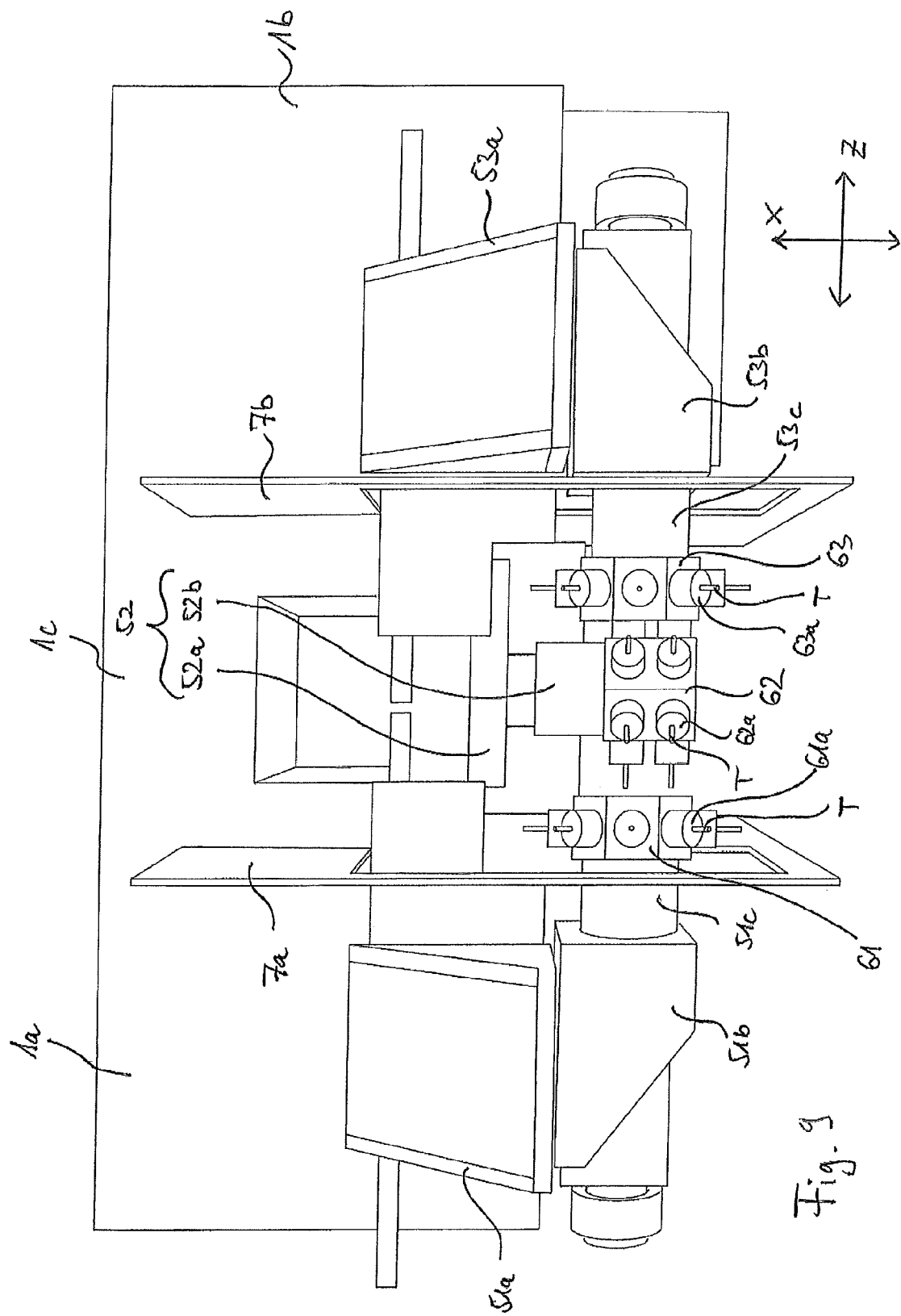
FIG. 9 is an exemplary schematic plan view of the machine tool in accordance with the second preferred embodiment of the present invention from FIG. 8.

FIG. 9 is an exemplary schematic plan view of the machine tool in accordance with the second embodiment of the present invention from FIG. 8. FIG. 9 shows that in this embodiment the first and second tool carrier slides 51 and 53 are in the form of compound slides, a first respective partial slide 51a or 53a being displaceable in direction Z of the spindle axes on the respective tool carrier face WTS1 or WTS2 of the respective carrier portion 1a or 1b.

In turn, respective displaceable partial slides 51b and 53b, on which the tool turrets are each rotatably mounted on housings 51c and 53c about turret axes extending parallel to the spindle axes, are arranged on the first respective partial slides 51a and 53a. In this context, the housings 51c and 53c may comprise drives for controlling the turrets, and further serve to extend from the partial slides arranged close to the spindle housings 21a and 22a (with respect to the spindle axes) into the machining space in such a way that the tool carriers 61 and 63 can be arranged close to the spindles 21a and 22a in the machining space (with respect to the spindle axes).

In this embodiment, the second partial slides 51b and 53b are displaceable perpendicular to the spindle axes, in particular in the same direction Y as the second tool carrier slide 52, in other words for example in the vertical direction in this embodiment.

FIG. 10 is an exemplary schematic detail of the machining space of the machine tool in accordance with the second embodiment of the present invention from FIG. 8.

In FIG. 10, it can be seen that in accordance with this embodiment the tool turret 62 is in the form of a double turret head, each face of the turret head 62 comprising at least two mounts 3a' and 3a" which are arranged side by side in direction X of the turret axis.

In accordance with this embodiment, the turret head 62 is displaceable in direction X of the turret axis for aligning the tools T in the case of coaxial work spindles, in such a way that the tool turret is set up to align a first or second mount 3a' or 3a" of a face of the turret head with one of the work spindles 21 or 22 by displacement of the turret head 62 in direction X of the turret axis. In this context, a telescopic shaft unit 52b may be provided arranged on the tool carrier slide 52a, in such a way that the turret head 62 is displaceable in direction X by means of the telescopic shaft unit 52b (see FIG. 9).

In summary, the present invention makes it possible to improve a machine tool of the generic type in such a way that it is possible to machine the workpieces efficiently with as many tools as possible, which have the maximum capacity for simultaneous use, with the maximum possible flexibility in the control of the relative movements between the tools and the tools received in the work spindles, together with a compact construction of the machine tool and a machining space which the machinist can see into as easily as possible.

The invention claimed is:

1. A machine tool comprising:
 a machine frame comprising a first carrier portion having a first tool carrier face, a second carrier portion having a second tool carrier face, and a central portion arranged between the first and the second carrier portion and having a third tool carrier face,
 wherein the first tool carrier face of the first carrier portion and the second tool carrier face of the second carrier portion are arranged on the same first face of the machine frame, and the third tool carrier face of the central portion is arranged on a second face of the machine frame;
 a first work spindle arranged on the first carrier portion for receiving a first workpiece; and
 a second work spindle, facing the first work spindle and arranged on the second carrier portion, for receiving a second workpiece, wherein the spindle axis of the second work spindle is orientated parallel or coaxial with the spindle axis of the first work spindle;
 a first tool carrier slide, which is arranged on the first tool carrier face of the first carrier portion and on which a first tool carrier is arranged; and
 a second tool carrier slide, which is arranged on the second tool carrier face of the second carrier portion and on which a second tool carrier is arranged; and
 a third tool carrier slide, which is arranged on the third tool carrier face of the central portion and on which a third tool carrier is arranged,
 wherein the third tool carrier slide is displaceable in a first direction transverse or perpendicular to the spindle axes of the first work spindle and second work spindle, and the third tool carrier is arranged between the first work spindle and the second work spindle; and
 wherein the first tool carrier face of the first carrier portion supporting the first tool carrier slide and the second tool carrier face of the second carrier portion supporting the second tool carrier slide substantially span a first plane, which is aligned obliquely with respect to a vertically oriented second plane, which is substantially spanned by the third tool carrier face of the central portion supporting the third tool carrier slide.

2. The machine tool of claim 1 wherein the first and/or second work spindles are displaceable in the direction of the spindle axes.

3. The machine tool of claim 1 wherein the second plane is indented in a horizontal direction towards the machine frame with respect to faces of the first and second carrier portions.

4. The machine tool of claim 1 wherein a face of the first carrier portion facing the second carrier portion, the third tool carrier face of the central portion, and a face of the second carrier portion facing the first carrier portion form a machining space in the machine frame.

5. The machine tool of claim 1 wherein the first work spindle is arranged on the first tool carrier face of the first carrier portion and/or the second work spindle is arranged on the second tool carrier face of the first carrier portion.

6. The machine tool of claim 1 wherein the first work spindle is arranged on a first spindle carrier face of the first carrier portion and/or the second work spindle is arranged on a second spindle carrier face of the second carrier portion, the first spindle carrier face and the second spindle carrier face being arranged on the same second face of the machine frame as the third tool carrier face.

7. The machine tool of claim 6 wherein the first spindle carrier face of the first carrier portion and the second spindle carrier face of the second carrier portion substantially span a third plane, the first plane being aligned substantially perpendicularly or obliquely with respect to the third plane.

8. The machine tool of claim 7 wherein the second plane is aligned substantially parallel to the third plane, the second plane being indented towards the machine frame with respect to the third plane.

9. The machine tool of claim 1 wherein the third tool carrier slide is guided on guide rails which are fixed on the third tool carrier face of the central portion of the machine frame and are oriented in the first direction transverse or perpendicular to the spindle axes of the first work spindle and the second work spindle.

10. The machine tool of claim 1 wherein the first and/or second tool carrier slides are displaceable parallel or transverse, in particular perpendicular, to the spindle axes.

11. The machine tool of claim 1 wherein the first and/or second tool carriers are displaceable in the first direction transverse to the spindle axes, in a second direction transverse to the first direction and transverse to the spindle axes, and/or in a third direction parallel to the spindle axes.

12. The machine tool of claim 1 wherein the first and/or second tool carrier is/are in the form of a tool turret, which comprises a tool-carrying turret head rotatably mounted about a turret axis aligned parallel to the spindle axes.

13. The machine tool of claim 1 wherein the third tool carrier comprises at least one tool turret.

14. The machine tool of claim 1 wherein the first and second tool carriers are arranged substantially on the same side of the spindle axes.

\* \* \* \* \*